United States Patent [19]
Erle

[11] Patent Number: 5,434,571
[45] Date of Patent: Jul. 18, 1995

[54] RADAR TARGET SIMULATOR

[75] Inventor: Detlef Erle, Bergisch Gladbach, Germany

[73] Assignee: Tig Technische Industrieprodukte GmbH, Cologne, Germany

[21] Appl. No.: 183,318

[22] Filed: Jan. 19, 1994

[30] Foreign Application Priority Data

Jan. 20, 1993 [DE] Germany .................. 43 01 359.7

[51] Int. Cl.$^6$ .............................................. G01S 13/00
[52] U.S. Cl. ...................................... 342/36; 342/169; 364/439
[58] Field of Search ................ 342/169, 36, 165; 364/439, 441, 461

[56] References Cited

U.S. PATENT DOCUMENTS

| | | | |
|---|---|---|---|
| 3,622,680 | 11/1971 | Palmieri | 342/169 |
| 4,591,858 | 5/1986 | Jacobson | 343/17.7 |
| 4,656,480 | 4/1987 | Allezard et al. | 342/151 |
| 5,064,376 | 11/1991 | DeCrescent | 342/169 |
| 5,200,901 | 4/1993 | Gerstenfeld et al. | 364/439 |

FOREIGN PATENT DOCUMENTS 3016033 4/1980 Germany .

*Primary Examiner*—J. Woodrow Eldred
*Attorney, Agent, or Firm*—Diller, Ramik & Wight

[57] ABSTRACT

The radar target simulator serves for the training of air traffic controllers. It comprises a radar device (10) detecting the approach area of a runway, and a display device (17) for displaying the real targets detected by the radar device (10). The display device generates an approach line corresponding to an ideal approach. The instructor position comprises a simulation device (18) for generating simulation targets moving continuously depending on flight parameters of a simulated airplane, which have been inputted. The real targets detected by the radar device (10) and the simulation targets are displayed together on the display device (17). The simulation device (18) is used to check the correctness of the adjustment of the radar device (10). Therefore, an airplane performing an ideal approach is simulated on the display device (17) and it is detected whether there are any deviations of the simulation target from the approach line displayed on the display device. Thereby, the efforts for monitoring and checking the radar device are substantially reduced.

4 Claims, 4 Drawing Sheets

RADAR TARGET SIMULATOR

The present invention relates to a radar target simulator for the training of air traffic controllers.

BACKGROUND OF THE INVENTION

An essential part of an air traffic controller's job consists in monitoring the runway approach of airplanes on the radar screen of a display device and in intercommunicating with the pilot in order to guide the airplane into the intended approach path. In doing so, the particular conditions of the airport (airport parameters), the environment variables (e.g., wind) as well as the parameters of the specific airplane have to be considered. Moreover, other airplanes nearby have to be monitored in order to avoid dangerous situations or collisions. To get a license or keep it, air traffic controllers have to prove to have monitored a certain number of approaches. Since it is often impossible to perform the training in normal air traffic, special flights are frequently made for air traffic controller training only, which is very expensive due to the high costs of a flying hour.

To guide the approach and flying manoeuvres, airports are equipped with radar devices which are arranged laterally adjacent the runway. These radar devices are connected to display devices in the approach control center. On a screen, the display devices display an approach line corresponding to an ideal approach which leads exactly, on a predetermined path, to the landing point at the beginning of the runway. The radar device detects radar targets in vertical planes (elevation) and horizontal planes (azimuth), and the elevation plane and the azimuth plane are simultaneously displayed in various representations on the display device. An approach line corresponding to an ideal approach is simultaneously displayed for each of the two planes. Upon appearance of the airplane as radar target on the screen of the display device, the air traffic controller can monitor the deviations of the airplane position from the (ideal) approach line with respect to elevation and azimuth and guide the pilot in such a manner that the airplane flies exactly along the approach line in both planes.

Conventional simulators for the training of air traffic controllers are exclusively adapted to generate simulation targets, i.e. artificially generated radar targets, simulating the airport environment and flying airplanes. The basic training of air traffic controllers can be made with such simulators, thereafter, however, the air traffic controllers have to be trained on a real airport with actually flying airplanes. Each air traffic controller gets his license only for the specific airport where his training has been performed. With known flight simulators, it is not possible to include the conditions of a real airport in the simulation training.

An essential prerequisite for the correspondence between the actual approach line and the approach line displayed on the screen of the display device is that the radar device is exactly adjusted with respect to the runway. The vertical axis of the radar device, for example, which, at the same time, constitutes the rotational axis, has to be positioned with high accuracy. The rotation of the radar antennas with respect to the stationary coordinate system also has to be performed with high angular accuracy. Upon the assembly of radar devices, a highly accurate adjustment of the positions of the radar device and the various axes is performed. If the rotational angle deviates by only some tenths of a degree, this results in an erroneous determination of the extension of the runway axis. Since the adjustment of radar devices may become inaccurate in the course of time, frequent checking of the adjustment is required, for which purpose highly accurate measurements have to be performed. If misadjustments and/or deviations are detected, readjustments have to be made.

A conventional radar target simulator is known from German Patent Application DE 30 16 033 A1. This radar target simulator serves for causing lasting disturbances of the radar image as are caused by the opponent in electronic combats. The purpose of these disturbances is to prepare the operator of the radar device for disturbance situations by intensive training in order to be able to take adequate countermeasures. The simulation apparatus includes a ROM wherein the parameters of the flight route of an artificial target are stored as a function of time. The artificial targets are established by means of a computer without any cooperation of the simulator and are available in the form of a data carrier. The ROM modules of the simulator are programed with these data carriers. The motion paths of the artificial targets are fixed.

SUMMARY OF THE INVENTION

It is the object of the present invention to provide a radar target simulator for the training of air traffic controllers, which permits the simulation of situations close to reality.

A substantial feature of the radar target simulator according to the present invention is that the real targets detected by the radar device as well as the simulation targets generated by a simulation device are displayed on the display device. So to speak, the simulation targets are thus artifically faded into the contents of the radar image and are superimposed thereon. The radar device shows all real targets of the airport, i.e, apart from airplanes, buildings, high-tension-line towers and the like, too, so that the air traffic controller obtains a representation of the actual conditions on the screen, which is close to reality. Airplanes as simulation targets are faded in by the simulation device. While the air traffic controller or trainee sees only the display device, the simulation device being typically placed in a separate room is operated by the instructor. The instructor inputs parameters into the simulation device, which refer to one or several airplanes and which, e.g., relate to the airplane type, the flight direction, the flying speed, the climb or descent rate. Other parameters may also be inputted, such as wind force and wind direction or wind velocities in different heights. The simulation device causes a continuous movement of the simulation targets corresponding to the parameters inputted by the instructor. On the display device, the air traffic controller sees the real targets as well as the simulation targets. This means that he perceives both the actual air traffic and the moving simulation targets. Further, the instructor plays the part of the pilot of an airplane corresponding to a simulation target. Via radio, he communicates with the trainee who gives instructions as to how the simulation target is to be controlled, and he changes the parameters, e.g., the descent rate and the flying speed or the flight direction, in correspondence to the trainee's instructions. All signals, those of the real targets as well as those of the simulation targets and their changes over time together with the communication between instructor and trainee can be recorded, so that possible mistakes or critical situations can subsequently be discussed.

The cooperation of simulation device and radar device requires that the coordinate systems of these two devices are mutually adapted or have a predetermined relation with respect to each other. The coordinate system of the radar device, in turn, is adjusted to the stationary coordinate system of the airport environment in a predetermined manner. If, for example, misadjustments due to a defective mechanism occur at the radar device in the course of time, the coordinate system of the radar device shows a deviation with respect to the stationary coordinate system. The relation between the coordinate system of the simulation device and the originally correctly adjusted coordinate system of the radar device, however, is preserved. An embodiment of the invention utilizes this circumstance in order to check the adjustment of the radar device. Therefore, an ideal approach is simulated on the simulation device, and on the display device, it is detected whether the respective simulation target performing the approach moves along the approach line displayed on the display device. If the simulation target moves along the approach line, the adjustment of the radar device is correct. If, however, deviations occur, the adjustment has changed with respect to the initially adjusted state and readjusting is necessary. This readjustment can also be performed with the assistance of the simulation device.

By means of the combination of simulation device, radar, sending and receiving device and display device, it is thus possible to check the adjustment of the radar device within shortest time and without any measurements in the field. Thereby, the efforts for checking the radar device are substantially reduced with the aid of the simulation device.

BRIEF DESCRIPTION OF THE DRAWINGS

Hereinafter, an embodiment of the present invention is explained in detail with respect to the drawings, in which.

DESCRIPTION OF THE PREFERRED EMBODIMENT

Figure 1:
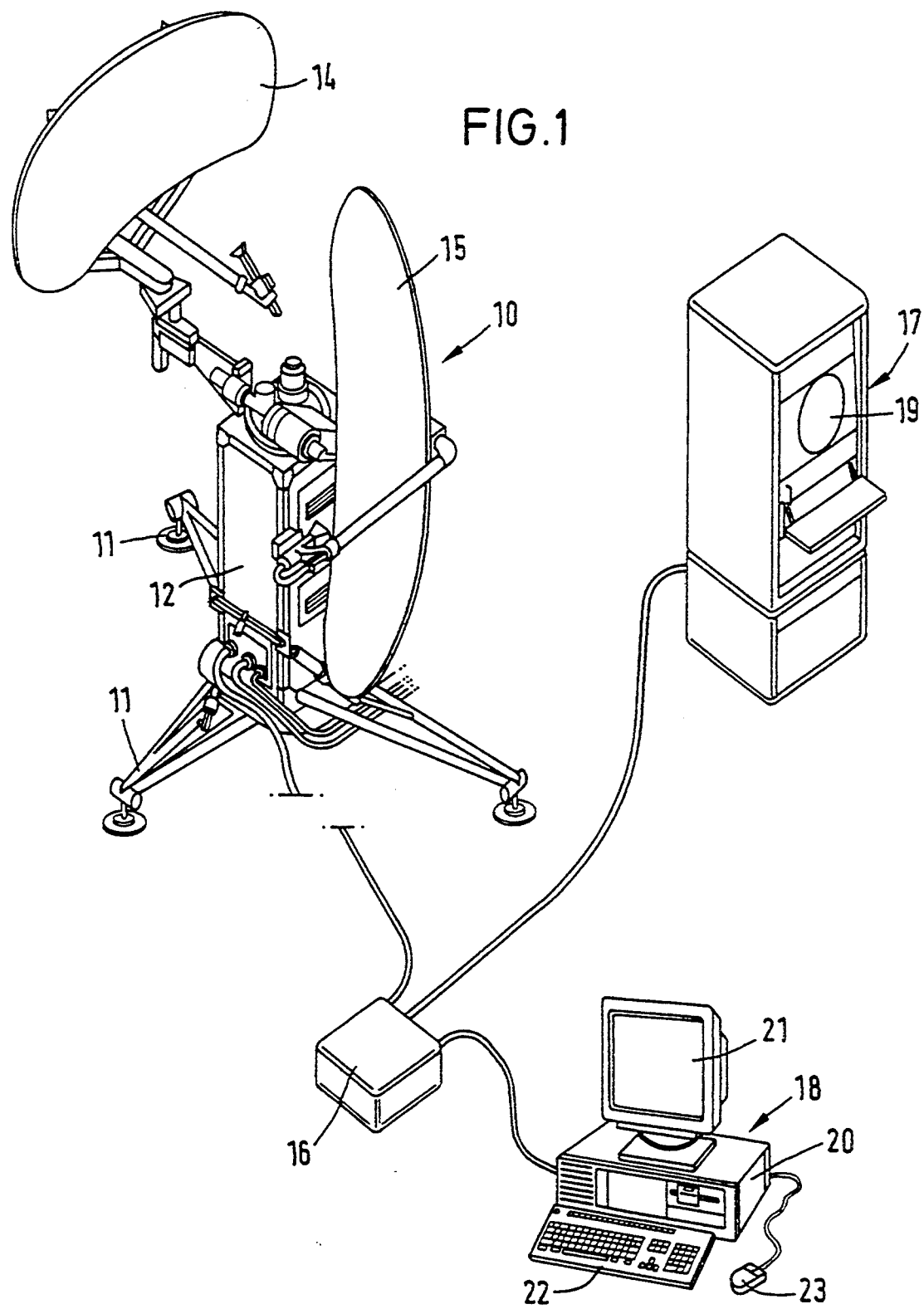
FIG. 1 is a schematic representation of the radar target simulator.

According to FIG. 1, the radar target simulator comprises a radar device 10 having a known construction, which is installed near the runway of an airport. The radar device 10 is provided with a housing 12 comprising the electrical components and standing on adjustable feet 11. A horizontal parabolic antenna 14 and a vertical parabolic antenna 15 emit bundled radar rays and receive the reflections thereof, respectively. By means of drives, the antennas 14 and 15 are pivotable about vertical and horizontal pivot axes, respectively.

The radar device 10 is connected to a connection unit 16 which, in turn, is connected to the display device 17 and the simulation device 18. The display device 17 is a common air traffic controller position with a screen 19, on which the signals of the radar device 10 are displayed. The trainee who communicates with the instructor via radio observes the display device 17.

The instructor sits at the simulation device 18 being positioned remotely from the display device 17 in a separate room. The simulation device 18 consists of a computer 20 with a screen 21, a keyboard 22 and a mouse 23. The computer 20 is a commercially available personal computer which has been converted so as to be able to generate simulation targets. It contains an airplane library in which the parameters of different airplane types are stored, for example maximum and minimum flying speed, maximum climb rate and the like. The instructor can fade up to four simulation targets, which he can choose among the available airplane types, into the radar image.

Figure 2:
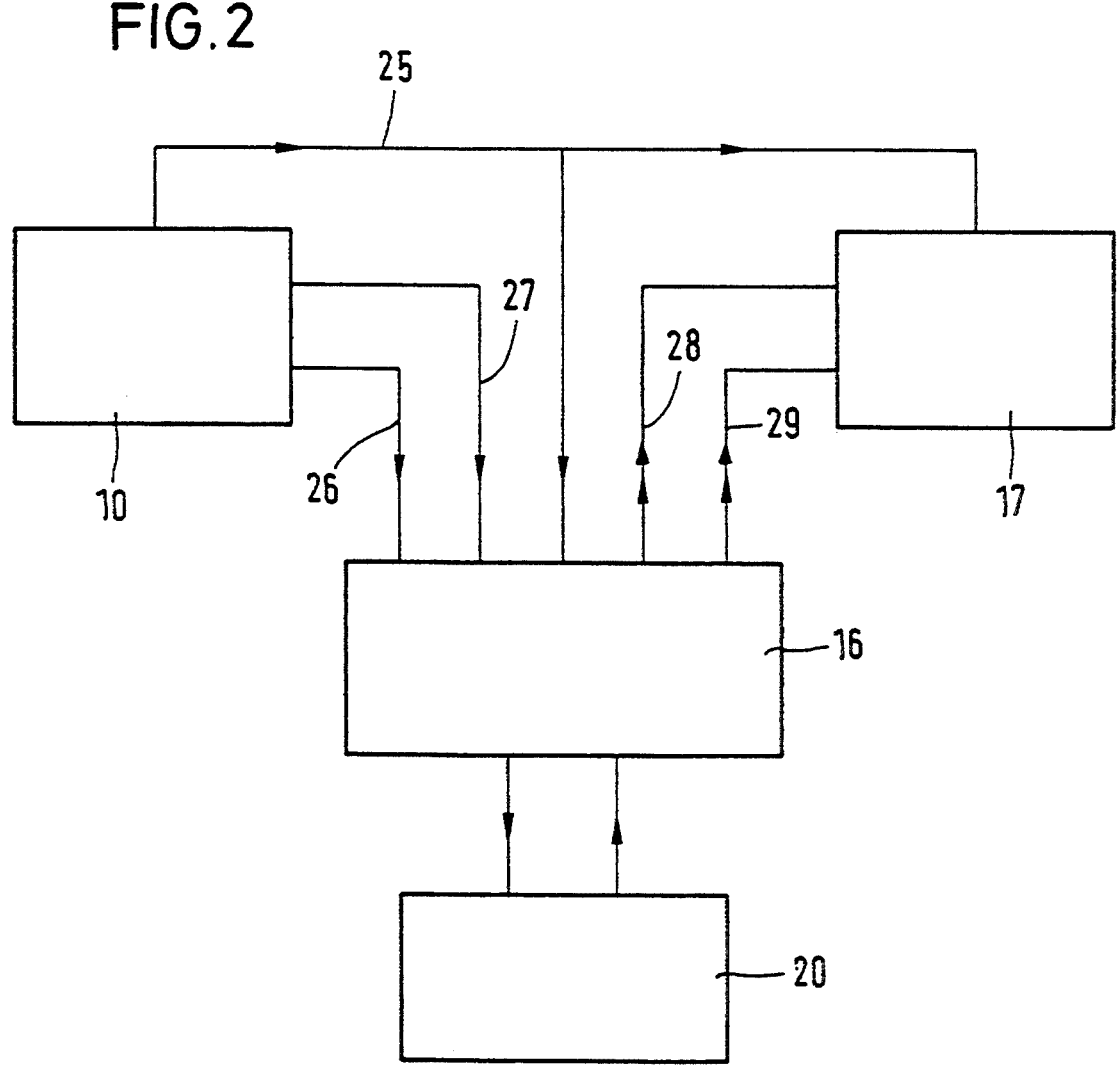
FIG. 2 shows a block diagramm of the radar target simulator.

FIG. 2 shows the block diagram of the installation. Via a line 25, the radar device 10 supplies synchronizing signals to the display device 17 and the connection unit 16. These synchronizing signals relate to the rotation of the antennas 14,15, and they indicate, among other things, the respective rotational angle of the antennas. Further, the radar device 10 supplies trigger signals via a line 26 and video signals of the detected real targets via a line 27 to the connection unit 16. The connection unit 16 receives signals of the simulation targets from the simulation unit 20 and supplies video signals via line 28 and trigger signals via line 29 to the display device 17. The double arrows at lines 28 and 29 indicate that these lines supply both the signals of the lines 26 and 27 and the simulation signals generated by the simulation device 20 and superimposed on these signals to the display device 17.

The radar target simulator permits a first modus "Simulation Only", in which the synchronizing signals are transmitted from the radar device via line 25 to the display device, but in which no trigger signals and no video signals are transmitted via lines 26 and 27. Then, only the simulation targets generated by the simulation device 20 are shown on the display device 17. In a second mode "Real Targets with Superimposed Simulation", the video signals and the trigger signals are also transferred from the radar device 10 to the connection unit 16, and therein, the simulation signals of the simulation device 20 are superimposed on the mentioned signals, so that the real targets and the simulation targets are displayed on the display device 17.

Furthermore, a third modus is possible, in which the simulation device 20 does not supply any simulation signals, so that only the real signals of the radar device 10 are transferred to the display device 17. The normal (third) mode of the radar device becomes effective at the simulation device 20 or at the connection unit 16, so that there is never any loss of information of the radar device.

Figure 3:
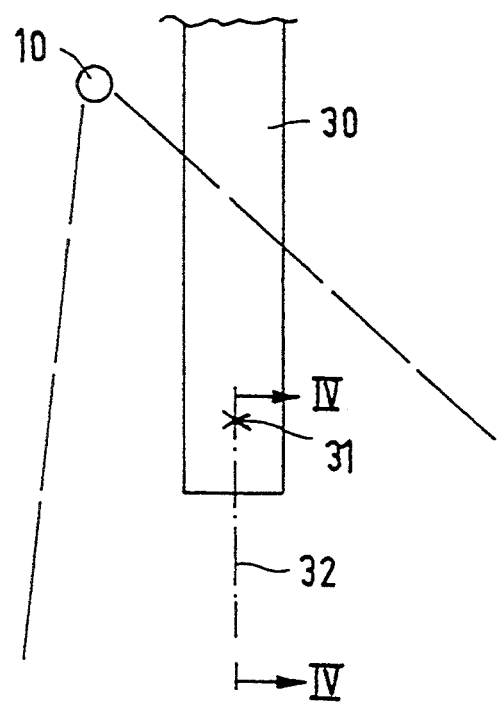
FIG. 3 shows an azimuth representation of the runway with the radar device.

FIG. 3 shows an azimuth representation of a runway 30 with the intended point of impact 31. The radar device 10 is placed laterally adjacent the runway 30. The approach has to be made in the direction of the longitudinal central axis 32 of the runway.

Figure 4:
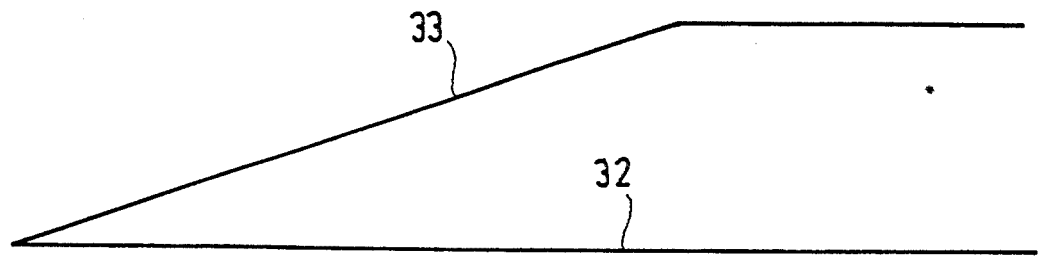
FIG. 4 shows an elevation representation of the approach path along the line IV—IV of FIG. 3.

FIG. 4 shows the approach path 33 in the vertical plane of the central axis 32. Since the radar device 10 is laterally offset with respect to this vertical plane, a conversion has to be performed upon displaying the approach line on the display device.

Figure 5:
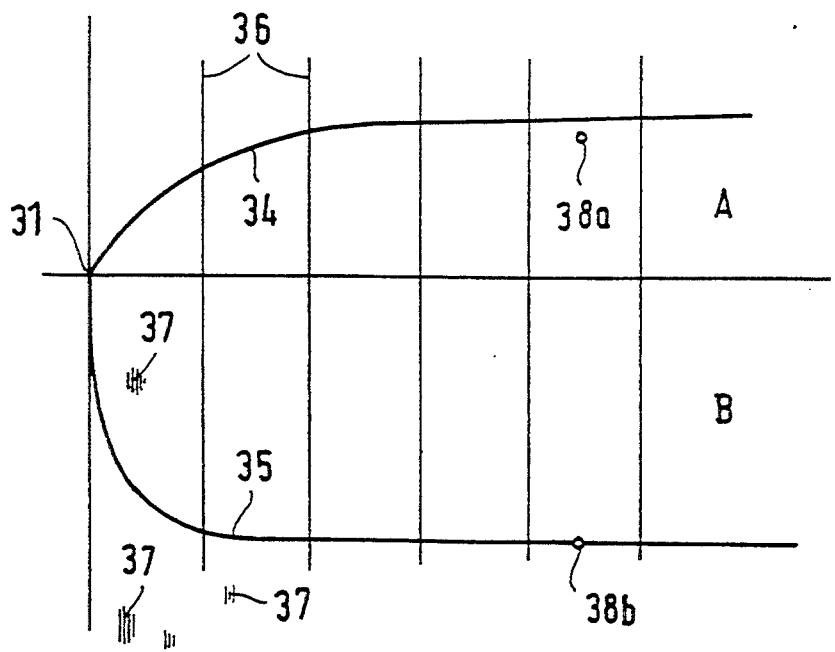
FIG. 5 is a representation of the screen display of the display device.
Figure 6:
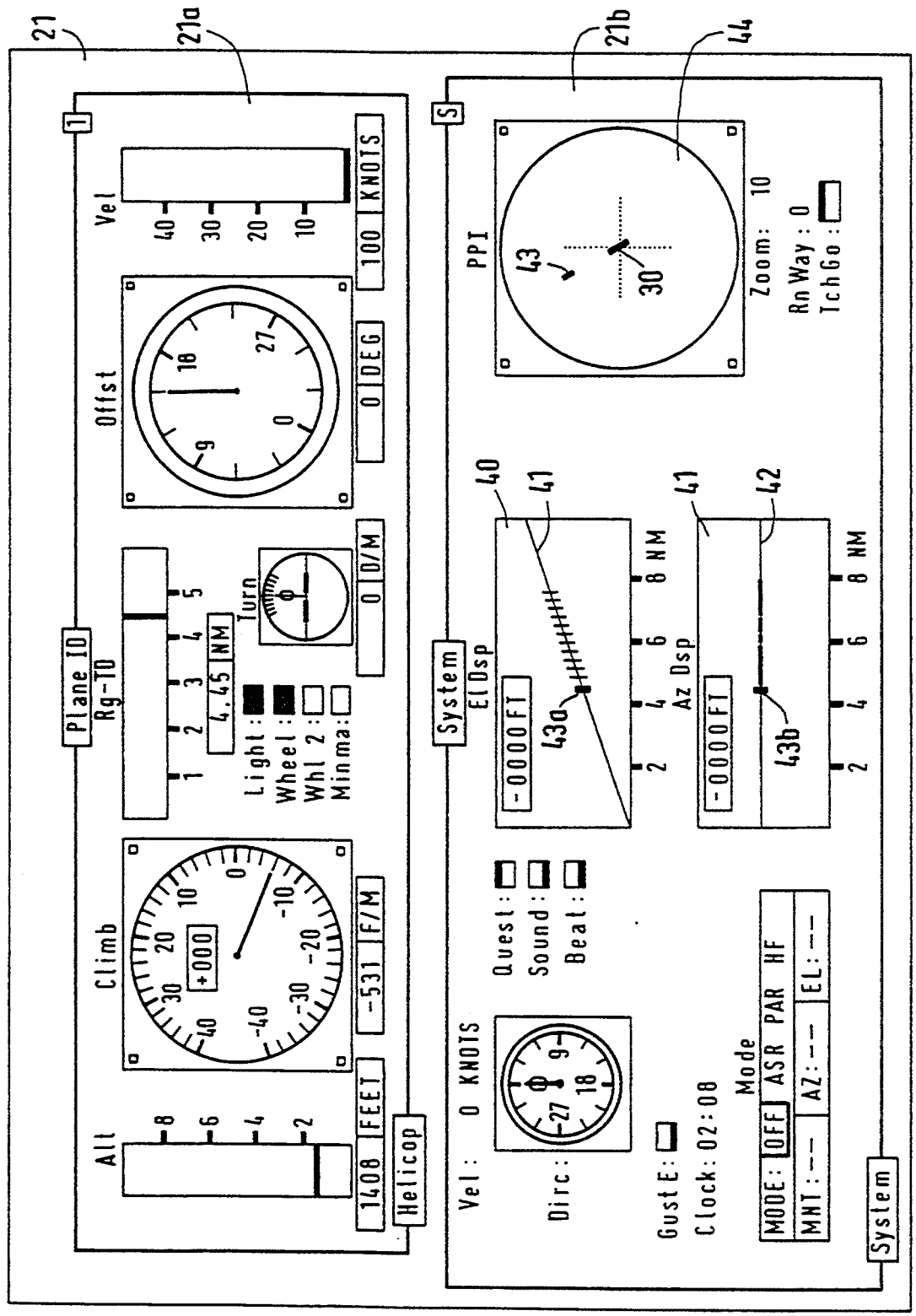
FIG. 6 shows one of several screen representations on the screen of the simulation device.

FIG. 5 shows an example of the display on the screen 19 of the display device 17. The tipper illustration A shows the elevation. The display device fades the approach line 34 corresponding to the approach path 33 of FIG. 4 into the image supplied by the radar device. Further, the approach line 35 in the azimuth is faded in. Both approach lines 34 and 35 are parabolic, since the distance from the radar device 10 is linearized, i.e. equidistant distance marks 36 are generated each of which corresponds to a predetermined distance between the radar target and the point of impact 31. Although the flight path 33 is linear, the display device displays the approach lines 34,35 in curved form.

The display device displays real targets 37 which are received by the radar device 10 and which are, for example, buildings near the airport. Further, airplanes which are actually flying in the air are detected as real targets by the radar device and represented on the screen in elevation and azimuth.

An airplane in approach must move exactly along the flight lines 34,35 on the radar screen. In FIG. 5, a simulation target is shown which has been generated by the simulation device 20 and which appears as light point 38a in elevation representation A and as light point 38b in azimuth representation B. The light point 38a is located below the approach line 34, which means that the height of the airplane does not suffice. The light point 38b is located precisely on the approach line 35, which means that the approach direction is correct. The air traffic controller sitting at the display device 17 has to instruct the pilot to increase the flight altitude. On the radar screen, the simulation target appears in the same way as a real target, so that it cannot be visually differentiated from a real target.

FIG. 5 shows one of the possible screen representations the instructor can generate on the screen 21 of the simulation device. in an upper representation 21a, the substantial displays are shown which are available for the pilot in the cockpit of an airplane, such as flight altitude, flying velocity, climb and descent velocity, respectively, curve velocity and flight direction. The instructor can change these parameters by operating the keyboard 22 and/or the mouse 23 in response to the instructions given by the trainee.

A second display field 21b on the screen 21 includes a graphic display 40 of the elevation and a graphic display 41 of the azimuth, in the plane of the approach path, respectively, the approach lines being indicated at 41 and 42, respectively. In the display 40, the instructor sees the light point 43a of the simulation target in elevation and in the display 41, he sees the light point 43b of the simulation target in azimuth. The previous positions of the simulation target are also displayed (less luminously), so that the previous approach way can be followed. All data of the approach way of the simulation target and also of the real targets are stored, so that, later on, they can be called for subsequent discussion. Similarly, the communication between trainee and instructor is stored as well.

Further, the field 21b comprises a display 44 of the runway 30 in top view, with the simulation target 43 approaching.

When setting the system into operation, the radar device 10 is initially exactly adjusted with respect to the runway 30, so that the approach lines 34 and 35 (FIG. 5) can be fixed. Then, the simulation device 20 is set in such a manner that a target moving along the approach lines 34 and 35 moves also exactly along the approach lines 41 and 42 in the simulation device. These adjustments mean that the radar device is brought into a defined orientation to a stationary coordinate system of the airport. The simulation device can be programmed corresponding to the stationary coordinate system.

In addition to the training purposes described, the radar target simulator can be used to check the exact adjustment of the radar device from time to time. Therefore, an airplane is simulated on the simulation device 18, which performs an exact approach along the approach lines 41 and 42. During this simulated approach, the screen 19 of the display device 17 is observed and it is detected whether the luminous points 38a and 38b extend along the stored approach lines 34 and 35. In case of deviations, readjustment of the radar device 10 is necessary.

I claim:

1. A radar target simulator, comprising a radar device (10) for detecting an approach area of a runway (30), a display device (17) for displaying real targets detected by the radar device (10) and for generating an approach line (34,35) corresponding to an ideal approach, and a simulation device (18) for generating simulation targets in dependence on flight parameters of a simulated airplane, which simulation targets move continuously, the real targets detected by the radar device (10) and the simulation targets being adapted to be displayed together on the display device (17), said radar target simulator being provided for use for the training of air traffic controllers, the simulation device (18) being arranged at an instructor position remote from the display device (17) and a radio communication between the instructor position and trainee position at the display device (17) being given, the simulation device (18) being configured such that the flight parameters of the simulated airplane may be changed by the instructor during the simulation operation.

2. The radar target simulator of claim 1, characterized by means for checking an adjustment of the radar device (10) by simulating an airplane performing an ideal approach and detecting deviations of the simulation target from the approach line (34,35) displayed on the display device (17).

3. The radar target simulator of claim 1, characterized by a connection unit (16) connecting the simulation device (18) to the radar device (10) and the display device (17), which connection unit superimposes the signals of the simulation targets generated by the simulation device (18) and those of the real targets detected by the radar device (10) and is adapted to be changed-over between a first mode "Simulation Only" and a second mode "Real Targets with Superimposed Simulation", only video signals of the radar device (10) being suppressed in the first mode, synchronizing signals, however, being supplied to the display device (17).

4. The radar target simulator of claim 1, characterized in that the simulation device (18) has an approach line (41,42) stored therein and comprises a display for the approach line and the radar targets.

* * * * *